Figure 1:
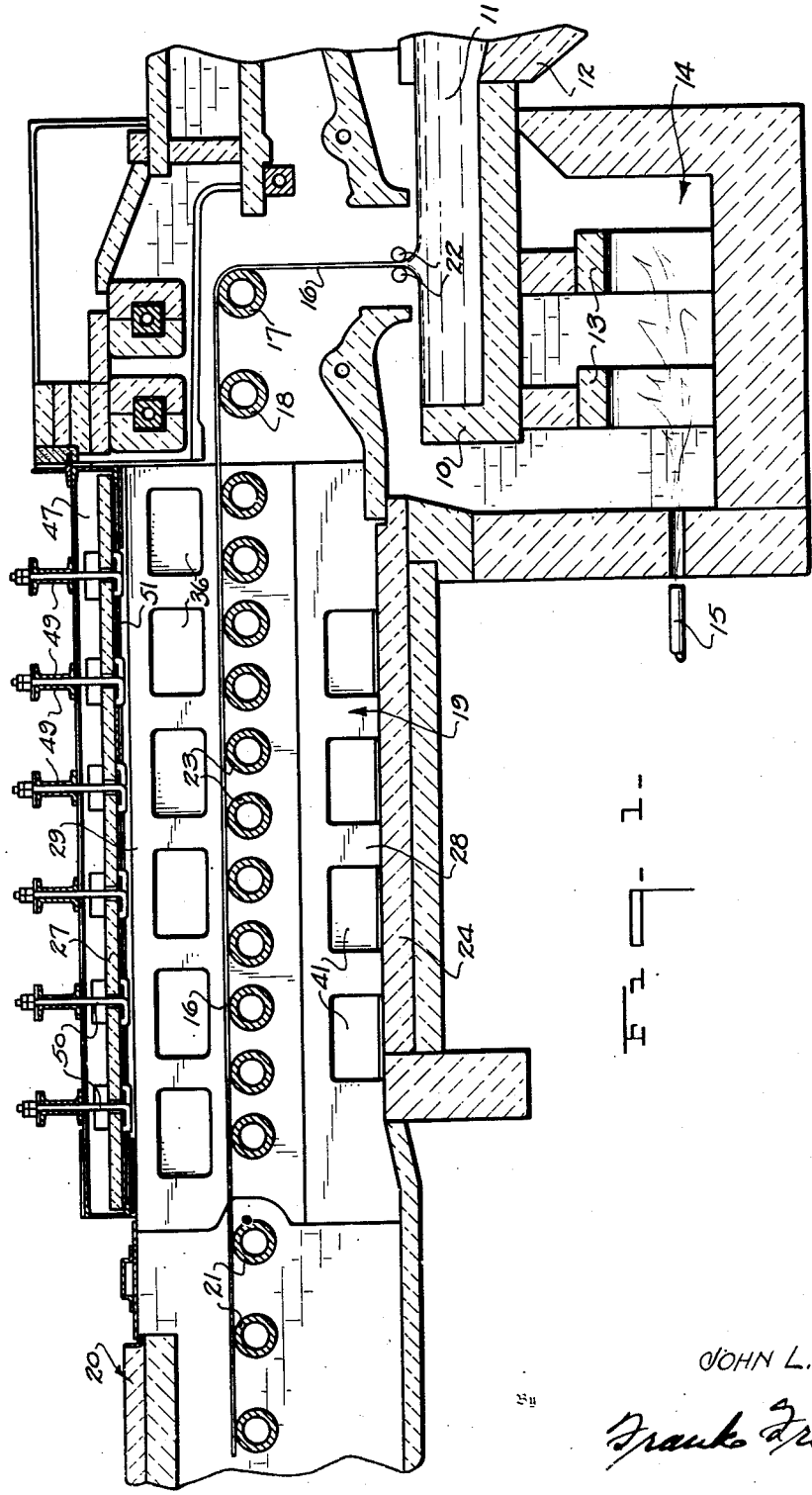

March 5, 1935. J. L. DRAKE 1,992,998

SHEET GLASS FORMING APPARATUS

Filed Sept. 15, 1932 5 Sheets-Sheet 5

Inventor
JOHN L. DRAKE.
By Frank Fraser
Attorney

Patented Mar. 5, 1935

1,992,998

UNITED STATES PATENT OFFICE 1,992,998

SHEET GLASS FORMING APPARATUS

John L. Drake, Toledo, Ohio, assignor to Libbey-Owens-Ford Glass Company, Toledo, Ohio, a corporation of Ohio Application September 15, 1932, Serial No. 633,301

9 Claims. (Cl. 49—17)

The present invention relates broadly to the art of producing sheet glass and more particularly to an apparatus for forming glass in continuous flat sheet form.

Although it is to be expressly understood that this invention is not limited to use in connection with any specific type of sheet glass forming apparatus, yet it has been particularly designed for and is of great utility when incorporated in a machine for drawing continuous sheet glass according to the Colburn process. In accordance with the Colburn system as exemplified in Patent No. 1,248,809, granted December 4, 1917, the glass producing materials are melted within one end of a rather long tank furnace, the molten glass flowing slowly through the melting and fining portions of the furnace to the opposite end thereof where the surface glass flows into a relatively shallow working receptacle to form a bath from which the sheet is drawn. The continuous sheet or ribbon of glass is drawn upwardly from the surface of the molten bath within said receptacle and, while still in a semi-plastic condition, although substantially set in its final sheet form, is deflected over a bending roll into the horizontal plane. The sheet is then passed horizontally through suitable drawing and flattening mechanism and thence into and through an annealing leer.

The drawing and flattening mechanism heretofore ordinarily employed in the commercial operation of the Colburn machine embodies an endless draw table consisting of a series of pivotally associated metallic links arranged in link belt formation, the plastic glass sheet being carried upon the flat upper surface of this table and caused to settle thereupon, becoming flat while being carried along thereby. The friction of the glass sheet resting upon the traveling draw table serves to provide a tractive pull for drawing the said sheet upwardly from its molten source. In order to assist in the drawing and flattening of the glass sheet, however, there is superimposed above the draw table a plurality of transverse clamp bars also connected together in endless belt formation and being adapted to engage the opposite side edges only of the sheet resting upon said table.

According to this invention, the endless drawing and flattening mechanism described briefly hereinabove is eliminated and, in lieu thereof, there is employed a roller type draw table comprising a series of horizontally aligned driven rolls which function to draw the glass sheet upwardly from its molten source and effect the flattening thereof while being supported and carried along thereby. It has been found from actual practice that a roller type draw table of this character is greatly superior in many ways to the endless drawing and flattening mechanism heretofore employed insofar as the quality of glass sheet produced is concerned, as well as being much simpler in construction, less expensive to install and operate, and more easily and accurately controllable as regards temperature and operation.

Another important object of the invention is the provision of novel and improved means for mounting and driving the rolls constituting the drawing and flattening table, together with means for controlling the temperature of the supporting means for the said rolls so as to prevent overheating thereof.

Other objects and advantages of the invention will become more apparent during the course of the following description when taken in connection with the accompanying drawings.

Figure 2:
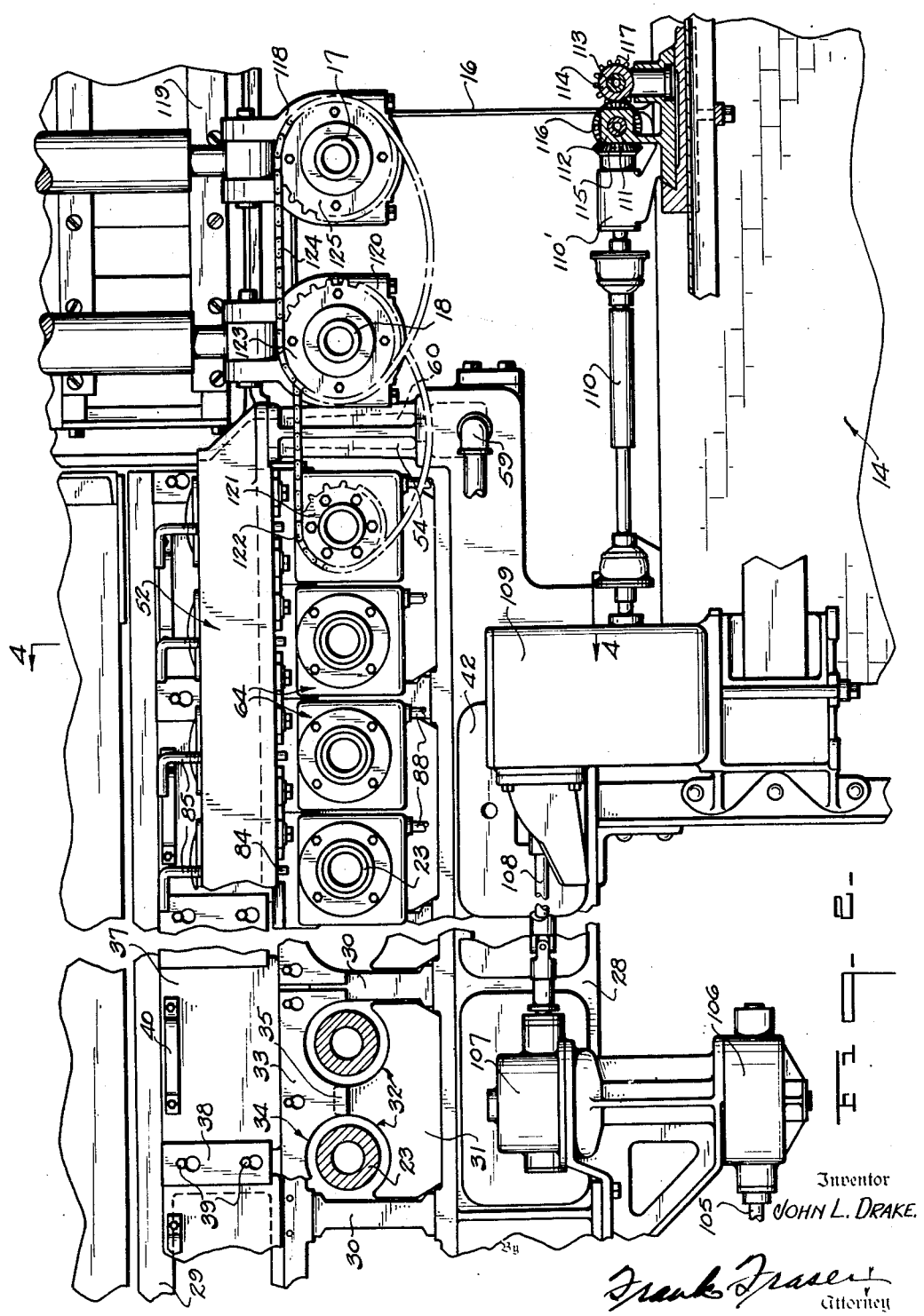
Figure 3:
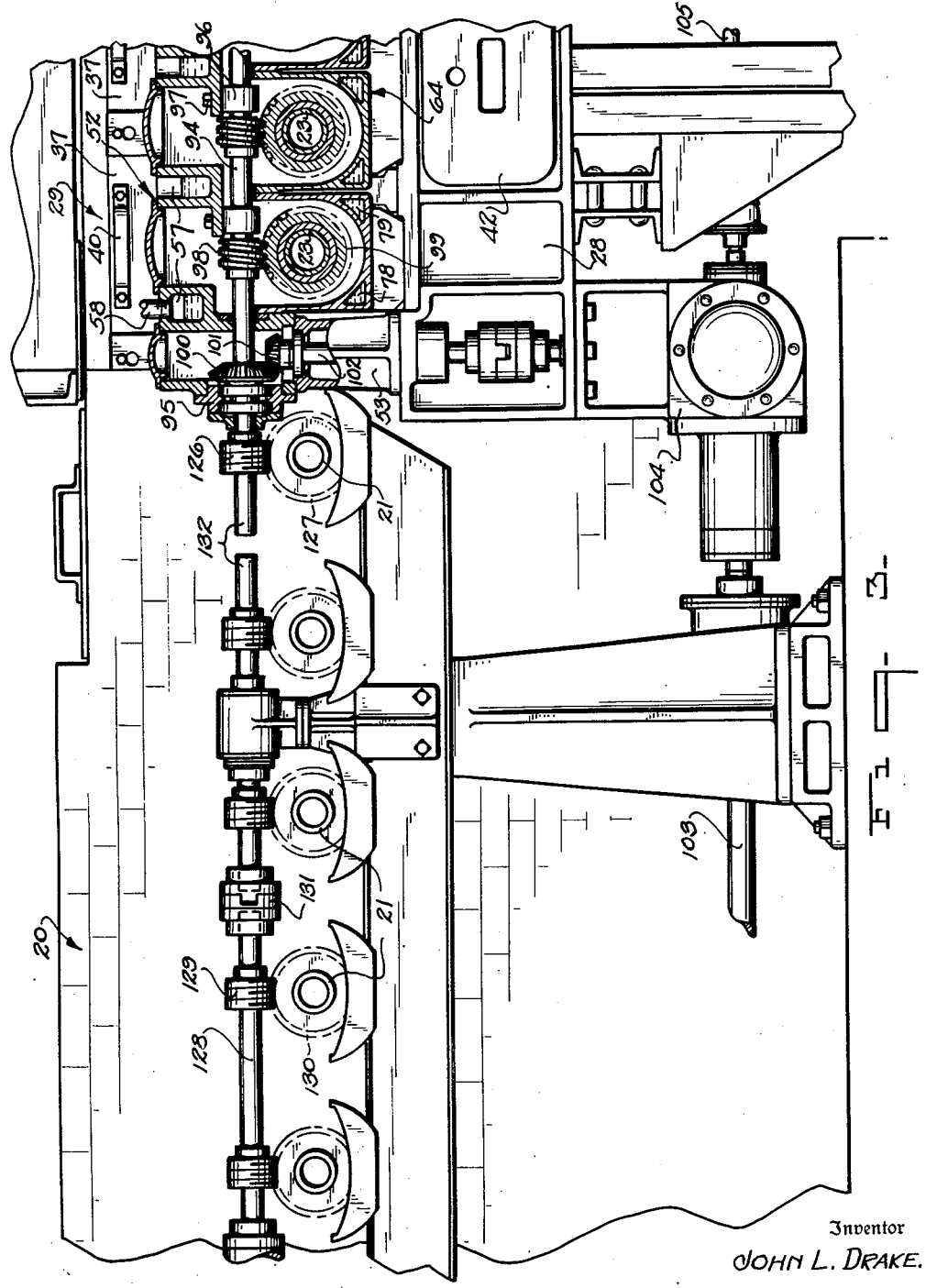
Figure 4:
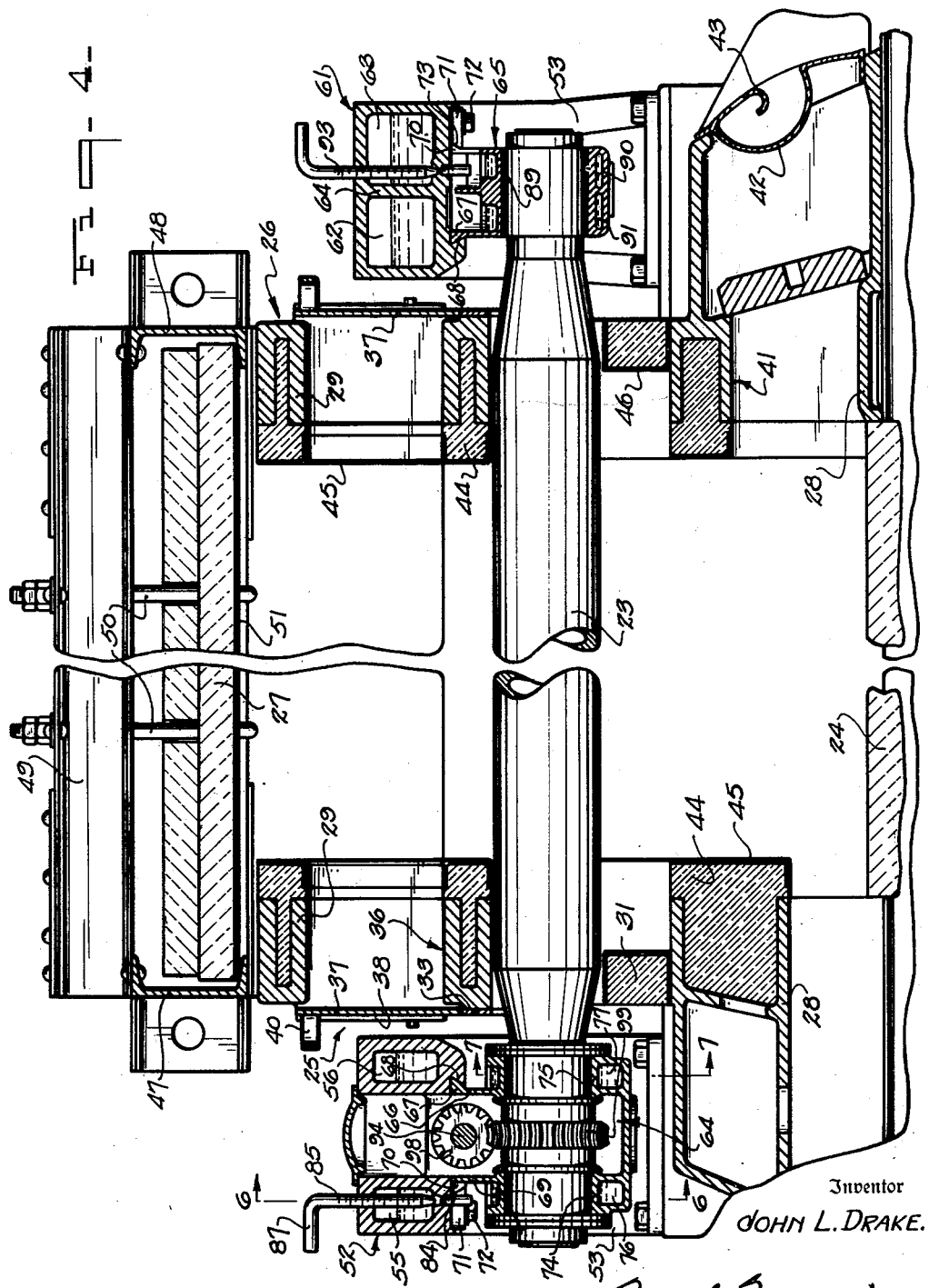
Figure 5:
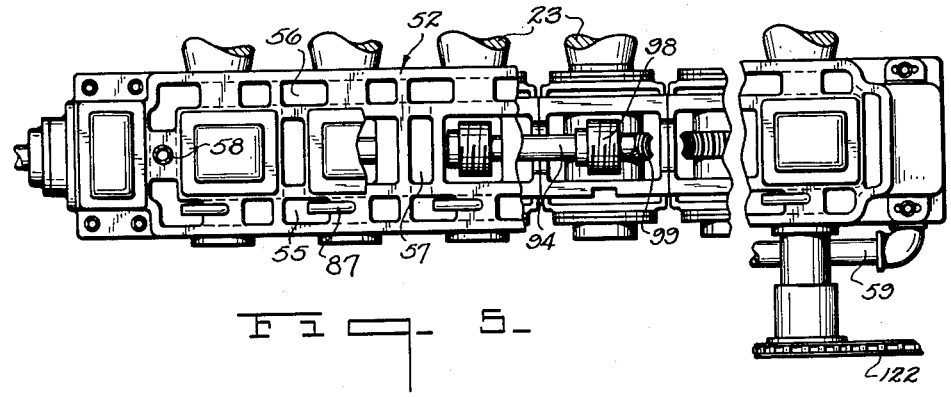
Figure 6:
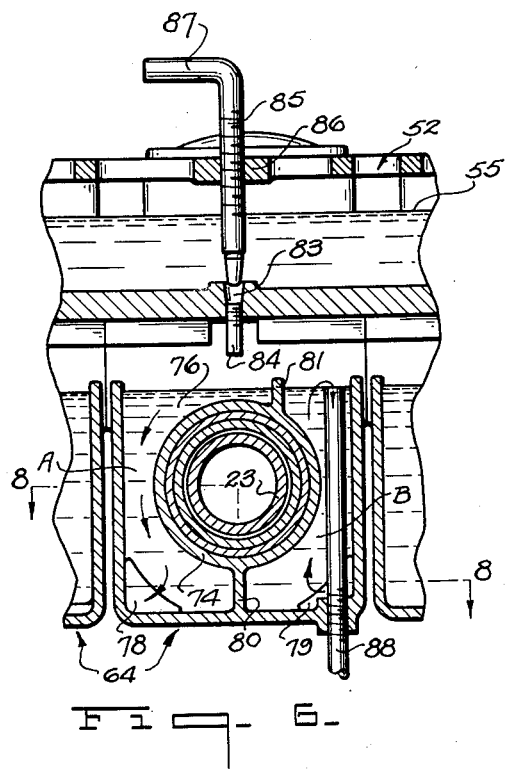
Figure 7:
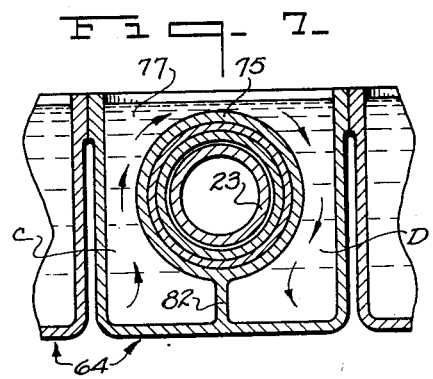
Figure 8:
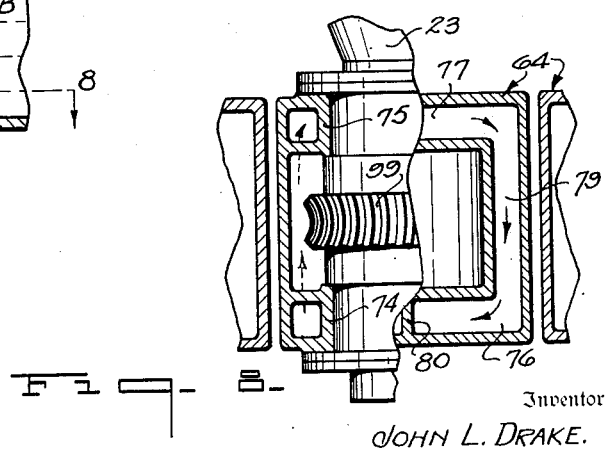

In the drawings forming a part of this application and wherein like numerals are employed to designate like parts throughout the same, Fig. 1 is a vertical longitudinal section through a sheet glass drawing machine constructed in accordance with the present invention, Fig. 2 is a side elevation of one end of the machine, partially in section, Fig. 3 is a side elevation of the opposite end of the machine, also partially in section, Fig. 4 is a vertical section through the machine, taken substantially on line 4—4 of Fig. 2, Fig. 5 is a plan view, partially in section, of one of the members for supporting the drawing and flattening rolls, Fig. 6 is a section taken substantially on line 6—6 of Fig. 4, Fig. 7 is a section taken substantially on line 7—7 of Fig. 4, and Fig. 8 is a section taken substantially on line 8—8 of Fig. 6.

Referring now to the drawings, and particularly with reference first to Fig. 1, the numeral 10 designates a relatively shallow working receptacle or draw pot containing a mass or bath of molten glass 11 which may be supplied thereto from any suitable type of glass melting furnace 12. The working receptacle 10 is here shown as being supported upon a plurality of stools 13 within a heating chamber 14, heated in any desired manner such as by means of gas burners 15.

A sheet of glass 16 is continuously drawn upwardly from the surface of the molten bath 11 and while still in a semiplastic condition, although substantially set in its final sheet form, the said sheet is deflected into the horizontal plane about a bending roll 17 and passed over a so-called idler or intermediate roll 18 into the drawing and flattening chamber 19. As the sheet emerges from the drawing and flattening chamber 19, it passes into an annealing leer 20 wherein it is supported and carried along upon a series of horizontally aligned rolls 21, preferably formed of asbestos. As the sheet passes through the leer, it is adapted to be suitably annealed and cooled as is well known in the art. For the purpose of maintaining the glass sheet being drawn to width, knurled rollers 22 may be positioned to engage the opposite sides of the sheet at each edge thereof.

The endless drawing and flattening mechanism referred to hereinabove as being customarily used in this type of machine has been located within the drawing and flattening chamber 19. However, and as already set forth, in accordance with the present invention, this endless drawing and flattening mechanism has been eliminated and there is employed in lieu thereof a roller type draw table comprising a series of horizontally aligned rolls 23 preferably formed of some suitable metal. These rolls are positioned relatively close to one another and are also arranged, as shown, in horizontal alignment with the bending roll 17, intermediate roll 18 and leer rolls 21. The rolls 23 constituting the draw table function to draw the sheet of glass 16 upwardly from the molten bath 11 and over the bending roll 17. As the sheet is carried over the rolls 23, it is caused to flatten out so that when it is passed into the annealing leer, it is flat and free from waves.

The drawing and flattening chamber 19 comprises a bottom 24, preferably constructed of refractory clay blocks, spaced vertical side walls 25 and 26 respectively and a top 27. Each side wall 25 and 26 includes a lower longitudinally extending horizontal member or casting 28 and an upper longitudinally extending horizontal member or casting 29. The upper casting 29 is supported upon the upper ends of a plurality of spaced vertical standards 30 which are in turn mounted upon the lower casting 28. The rolls 23 are positioned between the upper and lower castings and project at their opposite ends beyond the chamber 19 through the openings defined in the opposite side walls 25 and 26 thereof by the lower and upper castings 28 and 29 respectively and standards 30.

Supported upon the lower casting 28 between each pair of adjacent standards 30 is a block 31 (Fig. 2) of suitable insulating material, said block being cut away as at 32 so as to fit around the lower portions of two adjacent rolls 23. Carried by and depending from the upper casting 29 between each pair of standards 30 is a metal plate 33 also cut away as at 34 to fit around the upper portions of the corresponding rolls 23, the central portion of the plate 33 between said rolls slightly overlapping the central portion of the block 31 as indicated at 35. It will thus be seen that the blocks 31 and plates 33 cooperate with one another to substantially close the openings defined by the upper and lower castings 29 and 28 and standards 30.

The upper casting 29 is provided longitudinally of the chamber 19 with a plurality of spaced inspection openings 36 through which the operator may inspect the condition of the glass sheet 16 as it passes over the rolls 23. These openings are normally closed by removable doors 37, which doors are mounted for vertical sliding movement within guideways formed by and between the casting 29 and plates 38, said plates being secured to but maintained spaced from said casting by suitable fastening elements 39. Each door 37 may be provided with a handle 40 to facilitate the removal thereof.

The lower casting 28 is also formed longitudinally thereof with a plurality of spaced openings 41 normally closed by removable doors 42 having hand holds 43 to facilitate the removal thereof. These openings are provided to permit of the removal of broken glass etc. from within the chamber 19. The inner surfaces of the upper and lower castings are preferably covered with suitable insulation 44 which is in turn covered by a metal plate 45 provided with openings corresponding to the openings 36 and 41 in the said castings. The top, bottom and inner faces of the blocks 31 are also preferably provided with a suitable metal covering or cap 46 (Fig. 4).

Mounted upon the upper castings 29 of the side walls 25 and 26 and extending longitudinally of the chamber 19 are the channel beams 47 and 48 respectively having supported thereupon a plurality of pairs of spaced transverse channel beams 49 (Figs. 1 and 4) carrying hooks 50 for supporting the top wall 27, said top wall being also preferably constructed of a refractory material and having upon the bottom thereof a metal plate 51.

The means herein provided for rotatably supporting the rolls 23 will now be described in detail. To this end, there is positioned at one side of the drawing and flattening chamber 19 outwardly of side wall 25 a horizontal longitudinally extending supporting structure or member 52 mounted at one end upon a standard 53 (Fig. 3) carried at one end of the lower casting 28 and at its opposite end upon a standard 54 (Fig. 2) carried at the opposite end of said casting. This supporting member 52 is of a hollow construction and is formed with the longitudinally extending channels or passages 55 and 56 respectively in communication with one another by means of a plurality of transverse passages 57. The longitudinally extending and transverse passages 55, 56 and 57 are adapted to contain a suitable cooling liquid, usually water, and this cooling liquid may be introduced into one end of said supporting member through a pipe 58 (Figs. 3 and 5) and, after circulating through the said passages, may pass from the supporting member at the opposite end thereof through an outlet pipe 59, said pipe communicating with the interior of the supporting member through a passage 60 extending vertically through the supporting standard 54.

Arranged at the opposite side of the machine outwardly of side wall 26 is a longitudinally extending supporting structure or member 61 (Fig. 4) substantially similar to the supporting member 52 in that it also includes a pair of spaced longitudinally extending channels or passages 62 and 63 respectively which are adapted to contain a cooling liquid and which are in communication with one another by transverse openings or passages (not shown) but which are formed in the vertical dividing wall 64.

The rolls 23 are rotatably supported at their opposite ends within bearing housings 64 and 65 suspended from the supporting members 52 and 61 respectively. As best shown in Fig. 4, each of the bearing housings 64 and 65 is detachably associated with its respective supporting member so that it may be easily and conveniently removed whenever desired to the end that the mounting for each of the rolls 23 is entirely independent of the mounting for the other rolls so that any one roll may be removed from the machine without disturbing the remaining rolls. Thus, the inner vertical wall 66 of each bearing housing 64 and 65 is formed at its upper end with an enlarged bevelled portion 67 adapted to fit within the chamfered or undercut groove or recess 68 in the respective supporting member 52 or 61. The opposite vertical wall 69 of the bearing housings 64 and 65 carries a similarly enlarged bevelled portion 70 against which is adapted to fit a removable block 71 carried by the respective supporting member and removably secured in place by bolts 72. The inner edges of the blocks 71 are bevelled as at 73 to correspond to the bevelled portions 70. From the above, it will be readily apparent that when it is desired to remove any one of the rolls 23, it is simply necessary to first remove the blocks 71 whereupon the bearing housings 64 and 65 can be detached from the supporting members 52 and 61 by sliding them forwardly. The rolls can then be removed from the machine through the openings in the side walls of chamber 19.

Each bearing housing 64 comprises the spaced bearings 74 and 75 within which the adjacent end of roll 23 is journaled. Surrounding these bearings are the receptacles or chambers 76 and 77 respectively (Fig. 4) open at their upper ends and being connected together at their opposite lower corners by the transverse passages 78 and 79 (Figs. 3, 6 and 8). The chamber 76 (Fig. 6) is divided transversely into two non-communicating portions or sub-chambers A and B by means of a vertical transverse web 80 extending between the bearing 74 and bottom wall of said chamber, and also by an upstanding baffle 81 carried at substantially the top of said bearing. The chamber 77 (Fig. 7) is likewise divided transversely into two portions or sub-chambers C and D by means of a transverse web 82 similar to web 80. Although this web prevents communication between the sub-chambers C and D beneath the bearing 75, yet these two sub-chambers are in communication with one another above said bearing as will be apparent.

In the bottom wall of the longitudinally extending passage 55 of supporting member 52 there is provided a plurality of outlets 83 (Fig. 6), one being provided for each bearing housing 64 and positioned above the chamber 76 therein so that a portion of the cooling liquid is adapted to flow downwardly from said supporting member into the said chamber. Fitted within each outlet 83 is a relatively short depending outlet pipe 84. The flow of cooling liquid from the supporting member 52 into the chamber 76 may be controlled by a plurality of plug valves 85 threaded through the top portion 86 of the said supporting member and having a laterally turned upper end 87 constituting a handle to facilitate the turning thereof. The lower end of each plug valve 85 is received within the respective outlet 83 and adapted to control the effective opening thereof so as to regulate the flow of cooling liquid therethrough.

The cooling liquid is adapted to flow downwardly from the supporting member 52 through each of the outlets 83 into the chamber 76 in the respective bearing housing 64 located therebeneath, said cooling liquid being received within said chamber to the left of baffle 81 or, in other words, within the sub-chamber A. The cooling liquid then passes downwardly through said sub-chamber as indicated by the arrows in Fig. 6 and thence transversely through the passage 78 into the sub-chamber C of chamber 77. The liquid then passes upwardly around bearing 75, down the opposite side thereof through sub-chamber D as shown by the arrows in Fig. 7 and thence through the transverse passage 79 into the sub-chamber B of chamber 76. The cooling liquid then flows upwardly within sub-chamber B and finally outwardly thereof through the overflow pipe 88. From the above it will be readily apparent that there will be provided a continuous circulation of cooling liquid through the chambers 76 and 77 and around the bearings 74 and 75 in a manner to control the temperature thereof and prevent overheating of the same. Likewise, the circulation of the cooling liquid through the longitudinally extending and transverse passages of the supporting member 52 will serve to prevent overheating of said supporting member. Of course, only a portion of the cooling liquid within the supporting member 52 will flow downwardly through the outlets 83 into the bearing housings 64. When it is desired to remove any one of the bearing housings 64 for repair or replacement or in order to remove the corresponding roll 23, the outlet 83 positioned above said housing is adapted to be entirely closed by the respective valve 85 to completely shut off the supply of cooling liquid therethrough. The amount of cooling liquid flowing from supporting member 52 through the outlets 83 therein is so controlled that the chambers 76 and 77 will be substantially filled at all times, the level of the liquid within said chambers being maintained slightly beneath the top or upper edge of baffle 81.

The bearing housings 65 at the opposite side of the machine are internally cooled in substantially the same manner as bearing housings 64. Thus, each of the bearing housings 65 comprises a bearing 89 for the adjacent end of roll 23, said bearing being surrounded by the two chambers 90 and 91 which are in communication with one another by means of transverse passages (not shown). The cooling liquid is adapted to circulate through the chambers 90 and 91 and connecting trasverse passages in the same manner as described above in connection with bearing housings 64. Thus, the cooling liquid flows downwardly from the supporting member 61 through outlets formed in the bottom of passage 63 into chambers 90 and then, after passing into the chamber 91 and again back into chamber 90, flows exteriorly of the bearing housings through overflow pipes similar to pipes 88. The flow of cooling liquid from the supporting member 61 is controlled by rotatable plug valves 93.

The means for driving the rolls 23 includes a line shaft 94 extending longitudinally within the supporting member 52, said shaft being journaled at each end within a bearing 95 (Fig. 3) and supported intermediate its ends in a plurality of spaced bearings 96 secured to said supporting member 52 by bolts or the like 97. The line shaft 94 carries a plurality of worms 98, one being provided for each roll 23 and meshing with a worm gear 99 keyed thereto. Also keyed to the shaft 94 at the end thereof adjacent the annealing leer 20 is a bevelled gear 100 meshing with a correspondingly bevelled gear 101 carried at the upper end of a vertical shaft 102 journaled within the supporting standard 53. The vertical shaft 102 is driven from a main drive shaft 103 through suitable gearing contained in the gear case 104.

The shaft 103 extends through the gear case 104 as indicated at 105 (Fig. 2), and drives through suitable reduction gearing and connecting shafts contained in the housings 106 and 107, a horizontal shaft 108 which in turn drives through suitable reduction gearing in casing 109, the horizontal shaft 110 driving the knurled rollers 22. One of these knurled rollers 22 is mounted upon a shaft 111 journaled in a bearing 112, while the other knurled roller is mounted upon a shaft 113 journaled in bearing 114. The shaft 110 is rotatably supported adjacent its outer end within a bearing bracket 110' and carries a bevelled gear 115 meshing with and driving a bevelled gear 116 fixed to shaft 111 to positively drive the knurled roller 22 mounted thereupon. On the other hand, the knurled roller 22 carried by shaft 113 is driven from shaft 111 by intermeshing gears 117 mounted upon the roll shafts. The drive shaft 103 is connected by means of a transverse shaft and suitable reduction gearing with a shaft at the opposite side of the machine similar to shaft 110 for driving the opposite pair of knurled rollers 22.

The bending roll 17 is supported at each end within a bearing 118 (Fig. 2) hung from a supporting bracket 119, while the intermediate roll 18 is likewise journaled in a similar bearing 120 suspended from the supporting bracket 119. The first roll 23 adjacent the intermediate roll 18 carries at one end a sprocket 121 about which is trained a sprocket chain 122 also trained about a sprocket (not shown) carried by the intermediate roll 18. Also carried by the intermediate roll is a second sprocket 123, and trained about this sprocket is a sprocket chain 124 also trained about sprocket 125 carried by bending roll 17. From the above it will be readily apparent that the rolls 23, bending roll 18, intermediate roll 19, and knurled rollers 22 are all caused to be driven from a common source of power through the main drive shaft 103. The driving of these various parts of the machine from a common drive is highly desirable in that were they driven by separate driving means, it would be difficult to co-relate or co-ordinate the various speeds of the different parts and maintain them at the proper ratio. However, by driving the various parts from a common drive, the relative speeds of the several parts can be easily maintained.

As illustrated in Fig. 3, the shaft 94 driving the rolls 23 projects beyond the bearing 95 and carries a worm 126 meshing with and driving a worm gear 127 keyed to the first leer roll 21. The remaining leer rolls are driven from a horizontal line shaft 128 carrying a plurality of worms 129, one being provided for each of said rolls and meshing with a worm gear 130 carried thereby. The line shaft 128 preferably consists of a plurality of relatively short sections arranged end to end and coupled together by flexible couplings 131. Although the shaft 94 has been shown as driving only a single leer roll 21, yet it can readily be employed to drive any desired number of these rolls simply by connecting the adjacent ends 132 of the two shafts 94 and 128 together by means of a flexible coupling 131, and in removing any one of said flexible couplings connecting any two sections of the shaft 128 together.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, means for conveying the sheet while in a heated condition in a generally horizontal direction including a series of horizontally aligned rolls, means for independently mounting said rolls in a manner that any one roll may be removed from operative position without disturbing any of the remaining rolls, and means for internally cooling said last-mentioned means.

2. In sheet glass apparatus, means for conveying the sheet while in a heated condition in a generally horizontal direction including a series of horizontally aligned rolls, means for independently mounting said rolls in a manner that any one roll may be removed from operative position without disturbing any of the remaining rolls, said last-mentioned means embodying a pair of separate supporting housings arranged at the opposite ends of each roll and within which the said roll is journaled, and means for internally cooling said supporting housings.

3. In sheet glass apparatus, means for conveying the sheet while in a heated condition in a generally horizontal direction including a series of horizontally aligned rolls, means for independently mounting said rolls in a manner that any one roll may be removed from operative position without disturbing any of the remaining rolls, said last-mentioned means embodying a pair of separate supporting housings arranged at the opposite ends of each roll and within which the said roll is journaled, means for removably carrying said supporting housings, and means for internally cooling said supporting housings and the carrying means therefor.

4. In sheet glass apparatus, means for conveying the sheet while in a heated condition in a generally horizontal direction including a series of horizontally aligned rolls, means for independently mounting said rolls in a manner that any one roll may be removed from operative position without disturbing any of the remaining rolls, said last-mentioned means embodying a longitudinally extending horizontal supporting member arranged at each side of the series of rolls, a plurality of supporting housings removably carried by each of said supporting members and within which the opposite ends of said rolls are journaled, and means for internally cooling said supporting members and the supporting housings carried thereby.

5. In sheet glass apparatus, means for conveying the sheet while in a heated condition in a generally horizontal direction including a series of horizontally aligned rolls, means for independently mounting said rolls in a manner that any one roll may be removed from operative position without disturbing any of the remaining rolls, said last-mentioned means embodying a longitudinally extending horizontal supporting member arranged at each side of the series of rolls, a plurality of supporting housings removably carried by each of said supporting members and within which the opposite ends of said rolls are journaled, and means for circulating a cooling liquid through the supporting members, said members having a plurality of outlets formed therein through which a portion of the cooling liquid is caused to flow into the supporting housings.

6. In sheet glass apparatus, means for conveying the sheet while in a heated condition in a generally horizontal direction including a series of horizontally aligned rolls, means for independently mounting said rolls in a manner that any one roll may be removed from operative position without disturbing any of the remaining rolls, said last-mentioned means embodying a longitudinally extending horizontal supporting member arranged at each side of the series of rolls, a plurality of supporting housings removably carried by each of said supporting members and within which the opposite ends of said rolls are journaled, said supporting members being adapted to contain a cooling liquid and having a plurality of outlets formed therein, one being provided for each supporting housing so that a portion of the cooling liquid is caused to flow from the supporting members into said housings, and means for controlling the flow of liquid through said outlets.

7. In sheet glass apparatus, means for conveying the sheet while in a heated condition in a generally horizontal direction including a series of horizontally aligned rolls, means for independently mounting said rolls in a manner that any one roll may be removed from operative position without disturbing any of the remaining rolls, said last-mentioned means embodying a longitudinally extending hollow supporting member arranged at each side of the series of rolls, a plurality of supporting housings removably carried by each of said supporting members and within which the opposite ends of said rolls are journaled, said supporting members being adapted to contain a cooling liquid and having a plurality of outlets therein, one being provided for each supporting housing, each of said housings having chambers for receiving the cooling liquid therein from the supporting members, and means for causing said cooling liquid to circulate through said chambers.

8. In sheet glass apparatus, means for conveying the sheet while in a heated condition in a generally horizontal direction including a series of horizontally aligned rolls, means for independently mounting said rolls in a manner that any one roll may be removed from operative position without disturbing any of the remaining rolls, said last-mentioned means embodying a longitudinally extending hollow supporting member arranged at each side of the series of rolls, a plurality of supporting housings removably carried by each of said supporting members and within which the opposite ends of said rolls are journaled, said supporting members being adapted to contain a cooling liquid and having a plurality of outlets therein, one being provided for each supporting housing, each of said housings having chambers for receiving therein the cooling liquid flowing through the outlets in said supporting members, means for causing said cooling liquid to circulate through said chambers, and means for controlling the flow of cooling liquid through said outlets.

9. In sheet glass apparatus, means for conveying the sheet while in a heated condition in a generally horizontal direction including a series of horizontally aligned rolls, means for independently mounting said rolls in a manner that any one roll may be removed from operative position without disturbing any of the remaining rolls, said last-mentioned means embodying a longitudinally extending hollow supporting member arranged at each side of the series of rolls, a plurality of supporting housings removably carried by each of said supporting members and within which the opposite ends of said rolls are journaled, said supporting members being adapted to contain a cooling liquid and having a plurality of outlets therein, one being provided for each supporting housing, each housing being formed with a plurality of chambers in communication with one another, said outlets being positioned to direct the cooling liquid from the supporting members into one of said chambers, means for causing the cooling liquid to circulate through the chambers and to then flow exteriorly thereof, and means for controlling the flow of cooling liquid through said outlets.

JOHN L. DRAKE.